(12) United States Patent
Takeshita

(10) Patent No.: US 8,743,144 B2
(45) Date of Patent: Jun. 3, 2014

(54) MOBILE TERMINAL, SERVER DEVICE, COMMUNITY GENERATION SYSTEM, DISPLAY CONTROL METHOD, AND PROGRAM

(75) Inventor: Kazutaka Takeshita, Tokyo (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 12/785,655

(22) Filed: May 24, 2010

(65) Prior Publication Data

US 2010/0315433 A1 Dec. 16, 2010

(30) Foreign Application Priority Data

Jun. 11, 2009 (JP) ................. P2009-140457

(51) Int. Cl.
*G09G 5/00* (2006.01)
*G06T 19/00* (2011.01)
*G09G 5/14* (2006.01)

(52) U.S. Cl.
CPC ............ *G06T 19/00* (2013.01); *G06T 19/006* (2013.01); *G09G 5/14* (2013.01); *G09G 2340/125* (2013.01)
USPC ........... 345/632; 345/633; 345/634; 345/635; 701/438; 715/738; 715/739; 715/740; 715/741; 715/742; 715/743

(58) Field of Classification Search
CPC ........ G06T 19/00; G06T 19/006; G09G 5/14; G09G 2340/125
USPC ............................ 701/207–208, 438; 705/10, 705/14.56–14.58; 715/738–743
See application file for complete search history.

(56) References Cited

U.S. PATENT DOCUMENTS

| | | | |
|---|---|---|---|
| 6,636,249 B1 | 10/2003 | Rekimoto | |
| 2007/0005419 A1 | 1/2007 | Horvitz et al. | |
| 2007/0011617 A1* | 1/2007 | Akagawa et al. | 715/738 |
| 2007/0198184 A1* | 8/2007 | Yoshioka et al. | 701/211 |

(Continued)

FOREIGN PATENT DOCUMENTS

| | | |
|---|---|---|
| EP | 1 379 098 A1 | 1/2004 |
| JP | 2000-194726 | 7/2000 |
| WO | WO 02/099717 A2 | 12/2002 |
| WO | WO 02/099717 A3 | 12/2002 |

OTHER PUBLICATIONS

European Search Report mailed Jul. 5, 2011, in Berlin, in EP 10 16 4861.

*Primary Examiner* — Jin-Cheng Wang
(74) *Attorney, Agent, or Firm* — Finnegan Henderson Farabow Garrett & Dunner LLP

(57) ABSTRACT

There is provided a mobile terminal including a movement information acquisition section for acquiring movement information of a mobile terminal possessed by a user, a picked-up image acquisition section for acquiring a peripheral image of the mobile terminal, which is imaged by an imaging device, a transmission section for transmitting the movement information acquired by the movement information acquisition section to a server device which is connected to the mobile terminal via a network, a reception section for receiving community information which is generated by the server device based on a history of the movement information and which can be shared between the user possessing the mobile terminal and another user other than the user possessing the mobile terminal, and a display control section for displaying, on a display screen, a displayed image included in the community information in a superimposed manner on a peripheral image of the mobile terminal.

15 Claims, 12 Drawing Sheets

(56) References Cited

U.S. PATENT DOCUMENTS

| | | | |
|---|---|---|---|
| 2007/0219752 A1* | 9/2007 | Aoyama et al. | 702/187 |
| 2008/0122871 A1 | 5/2008 | Guday | |
| 2008/0171573 A1 | 7/2008 | Eom et al. | |
| 2009/0111434 A1 | 4/2009 | Yu et al. | |
| 2009/0125231 A1* | 5/2009 | Ichimura | 701/207 |
| 2009/0215469 A1* | 8/2009 | Fisher et al. | 455/456.3 |
| 2009/0315766 A1* | 12/2009 | Khosravy et al. | 342/357.07 |
| 2009/0319177 A1* | 12/2009 | Khosravy et al. | 701/207 |
| 2009/0319181 A1* | 12/2009 | Khosravy et al. | 701/208 |
| 2010/0004997 A1* | 1/2010 | Mehta et al. | 705/14.66 |
| 2010/0223135 A1* | 9/2010 | Griffin et al. | 705/14.58 |
| 2010/0280874 A1* | 11/2010 | Thorn | 705/10 |
| 2011/0028164 A1* | 2/2011 | Kato | 455/456.1 |
| 2011/0047471 A1* | 2/2011 | Lord et al. | 715/739 |

* cited by examiner

FIG. 4

| DATE AND TIME | MEASUREMENT METHOD | LATITUDE | LONGITUDE |
|---|---|---|---|
| 20090501 8:00:00 | GPS | N35:43:36 | E139:54:33 |
| 20090501 8:00:20 | GPS | N35:43:36 | E139:54:33 |
| 20090501 8:00:40 | GPS | N35:43:42 | E139:54:23 |
| 20090501 8:01:00 | GPS | N35:44:01 | E139:53:22 |
| 20090501 8:01:20 | GPS | N35:43:52 | E139:54:25 |
| ... | ... | ... | ... |

FIG. 5

| USER NAME 3021 | ATTRIBUTE 3022 | FRIEND 3023 | PARTICIPATING COMMUNITY 3024 | INFORMATION ACCESSIBLE TO OTHERS 3025 | LIMITATION TO ACCESSIBILITY 3026 |
|---|---|---|---|---|---|
| A | EMPLOYEE | C,E | COMMUNITY 1 COMMUNITY 2 COMMUNITY 3 | ATTRIBUTE, FRIEND, PARTICIPATING COMMUNITY, MOVEMENT INFORMATION | NO LIMITATION |
| B | STUDENT | F,A | COMMUNITY 2 | ATTRIBUTE, FRIEND | FRIENDS ONLY |
| C | EMPLOYEE, WORKING AT 5F, OSAKI BUILDING A | A,D | COMMUNITY 2 | ATTRIBUTE, PARTICIPATING COMMUNITY | SAME ATTRIBUTE ONLY |
| D | EXECUTIVE | A | COMMUNITY 3 | ATTRIBUTE, FRIEND, MOVEMENT INFORMATION | NO LIMITATION |
| E | HOUSEWIFE | C | COMMUNITY 1 | ATTRIBUTE, FRIEND, PARTICIPATING COMMUNITY | FRIENDS ONLY |
| F | STUDENT | A,B | COMMUNITY 1 COMMUNITY 2 | ATTRIBUTE, FRIEND, PARTICIPATING COMMUNITY, MOVEMENT INFORMATION | FRIENDS ONLY |
| ... | ... | ... | ... | ... | ... |

| COMMUNITY NO. | TITLE | PLACE | TIME | COMMENT | LIMITATION TO ACCESSIBILITY | REGISTERED USER |
|---|---|---|---|---|---|---|
| 1 | LUNCH IN MEGURO | MEGURO | 11:00~14:00 | COMMENT1 COMMENT2 COMMENT3 | NO LIMITATION | A,B,D,F,J |
| 2 | WORKING AT 5F, OSAKI BUILDING A | OSAKI | 09:00~10:00 | COMMENT4 | WORKERS OF 5F, OSAKI BUILDING A | A,C,E |
| 3 | EARLY-MORNING GOLF | SHINAGAWA | 06:00~08:00 | COMMENT5 COMMENT6 | FRIENDS ONLY | C,E |
| ... | ... | ... | ... | ... | ... | ... |

3031　3032　3033　3034　3035　3036　3037

303

MOBILE TERMINAL, SERVER DEVICE, COMMUNITY GENERATION SYSTEM, DISPLAY CONTROL METHOD, AND PROGRAM

BACKGROUND OF THE INVENTION

1. Field of the Invention

The present invention relates to a mobile terminal, a server device, a community generation system, a display control method, and a program, and more particularly relates to a mobile terminal, a server device, an information processing system, a display control method, and a program for generating a community based on a movement log of a user.

2. Description of the Related Art

Lately, Social Networking Service (hereinafter, referred to as SNS) is becoming widespread, which is a web site of community type which promotes and supports the interactions of people with each other.

In the case of establishing a community place such as SNS on a network, a user creates a community by, for example, releasing his/her own profile or photograph, registering a friend, and setting a viewing limitation. Further, as part of augmented reality, there is disclosed a technique of superimposing additional information of the created community or the like on a photographed image (for example, Japanese Patent Application Laid-Open No. 2000-194726).

SUMMARY OF THE INVENTION

In the case of establishing the above-mentioned community place, however, it was necessary for the user to explicitly create the community. Accordingly, in order to create many small and closed communities for an event, there was an issue that a large amount of labor, such as input of a community title or setting of participant limitation, was necessary.

In light of the foregoing, it is desirable to provide a novel and improved mobile terminal, server device, community generation system, display control method, and program, which can easily generate a community based on a movement log of a user.

According to an embodiment of the present invention, there is provided a mobile terminal which includes a movement information acquisition section for acquiring movement information of a mobile terminal possessed by a user, a picked-up image acquisition section for acquiring a peripheral image of the mobile terminal, which is imaged by an imaging device, a transmission section for transmitting the movement information acquired by the movement information acquisition section to a server device which is connected to the mobile terminal via a network, a reception section for receiving community information which is generated by the server device based on a history of the movement information and which can be shared between the user possessing the mobile terminal and another user other than the user possessing the mobile terminal, and a display control section for displaying, on a display screen, a displayed image included in the community information received by the reception section in a superimposed manner on a peripheral image of the mobile terminal acquired by the picked-up image acquisition section.

According to the above configuration, the movement information of the mobile terminal is transmitted to the server device, and the community information generated by the server device based on the history of the movement information can be displayed on the display screen. Thus, a community is easily generated based on a history of movement information without the user performing troublesome input, and it becomes possible to view/edit the community.

Further, the server device may store histories of pieces of movement information of a plurality of other users other than the user possessing the mobile terminal, and, when the history of movement information is common to the user possessing the mobile terminal and another user, the community information may be generated by the server device by using the common history of movement information.

Further, the movement information acquisition section may acquire movement information including position information of the mobile terminal and time information at which the position information is acquired.

Further, when a history of position information is common to the user possessing the mobile terminal and the another user, the community information may be generated by the server device by using the common history of position information.

Further, the history of the movement information of the another user used for generating the community information may be a history of the movement information of a user having an common attribute as the user possessing the mobile terminal.

Further, the history of the movement information of the another user used for generating the community information may be a history of the movement information of a user who has been registered beforehand.

Further, the history of the movement information of the another user used for generating the community information may be a history of the movement information which can be opened to the public.

Further, when the position information included in a predetermined position area is common to the user possessing the mobile terminal and the another user, the community information may be generated by the server device by using the common position information.

Further, when there is community information from among the community information received by the reception section, in which position information included in the community information is included in a predetermined position area, the display control section may display the community information on the display screen.

Further, the mobile terminal may further include an angle/direction information acquisition section for acquiring angle/direction information of the mobile terminal. The display control section may superimpose a displayed image included in the community information on the peripheral image acquired by the picked-up image acquisition section, based on the angle/direction information acquired by the angle/direction information acquisition section.

Further, the angle/direction information acquisition section may acquire angle/direction information including an azimuth of the user corresponding to an angle/direction of the mobile terminal, and the display control section may superimpose a displayed image included in the community information which corresponds to the azimuth of the user on the peripheral image imaged by the imaging device.

According to another embodiment of the present invention, there is provided a server device which includes a reception section for receiving pieces of movement information of mobile terminals possessed by a plurality of users from the respective mobile terminals, a recording section for accumulating a history of the movement information received by the reception section with respect to each user and recording the history in a storage medium, and a community information generation section for generating community information which can be shared between one user and another user, based on the history of the movement information with respect to each user recorded in the storage medium.

Further, when the history of movement information is common to the one user and the another user, the community information generation section may generate the community information by using the common history of movement information.

According to another embodiment of the present invention, there is provided an information processing system which includes a mobile terminal possessed by a user including a movement information acquisition section for acquiring movement information of the mobile terminal, a picked-up image acquisition section for acquiring a peripheral image of the mobile terminal, which is imaged by an imaging device, and a transmission section for transmitting the movement information acquired by the movement information acquisition section to a server device which is connected to the mobile terminal via a network, and the server device including a reception section for receiving pieces of movement information of mobile terminals possessed by a plurality of users from the respective mobile terminals, a recording section for accumulating a history of the movement information received by the reception section with respect to each user and recording the history in a storage medium, and a community information generation section for generating community information which can be shared between one user and another user, based on the history of the movement information with respect to each user recorded in the storage medium. The mobile terminal may include a reception section for receiving the community information generated by the server device, and a display control section for displaying, on a display screen, a displayed image included in the community information received by the reception section in a superimposed manner on a peripheral image of the mobile terminal acquired by the picked-up image acquisition section.

According to another embodiment of the present invention, there is provided a display control method for community information in a mobile terminal possessed by a user, which includes the steps of acquiring movement information of the mobile terminal, acquiring a peripheral image of the mobile terminal, which is imaged by an imaging device, transmitting the acquired movement information to a server device which is connected to the mobile terminal via a network, receiving community information which is generated by the server device based on a history of the movement information and which can be shared between the user possessing the mobile terminal and another user other than the user possessing the mobile terminal, and displaying, on a display screen, a displayed image included in the received community information in a superimposed manner on the acquired peripheral image of the mobile terminal.

According to another embodiment of the present invention, there is provided a program for causing a computer to function as a mobile terminal which includes a movement information acquisition section for acquiring movement information of a mobile terminal possessed by a user, a picked-up image acquisition section for acquiring a peripheral image of the mobile terminal, which is imaged by an imaging device, a transmission section for transmitting the movement information acquired by the movement information acquisition section to a server device which is connected to the mobile terminal via a network, a reception section for receiving community information which is generated by the server device based on a history of the movement information and which can be shared between the user possessing the mobile terminal and another user other than the user possessing the mobile terminal, and a display control section for displaying, on a display screen, a displayed image included in the community information received by the reception section in a superimposed manner on a peripheral image of the mobile terminal acquired by the picked-up image acquisition section.

According to the embodiments of the present invention described above, a community can be easily generated based on a movement log of a user.

BRIEF DESCRIPTION OF THE DRAWINGS

FIG. 4 is an explanatory view illustrating a history of movement information recorded in a storage medium according to the embodiment;

FIG. 5 is an explanatory view illustrating a content of attribute information of a user according to the embodiment;

FIG. 6 is an explanatory view illustrating community information generated by a community information generation section according to the embodiment;

DETAILED DESCRIPTION OF THE EMBODIMENT

Figure 1:
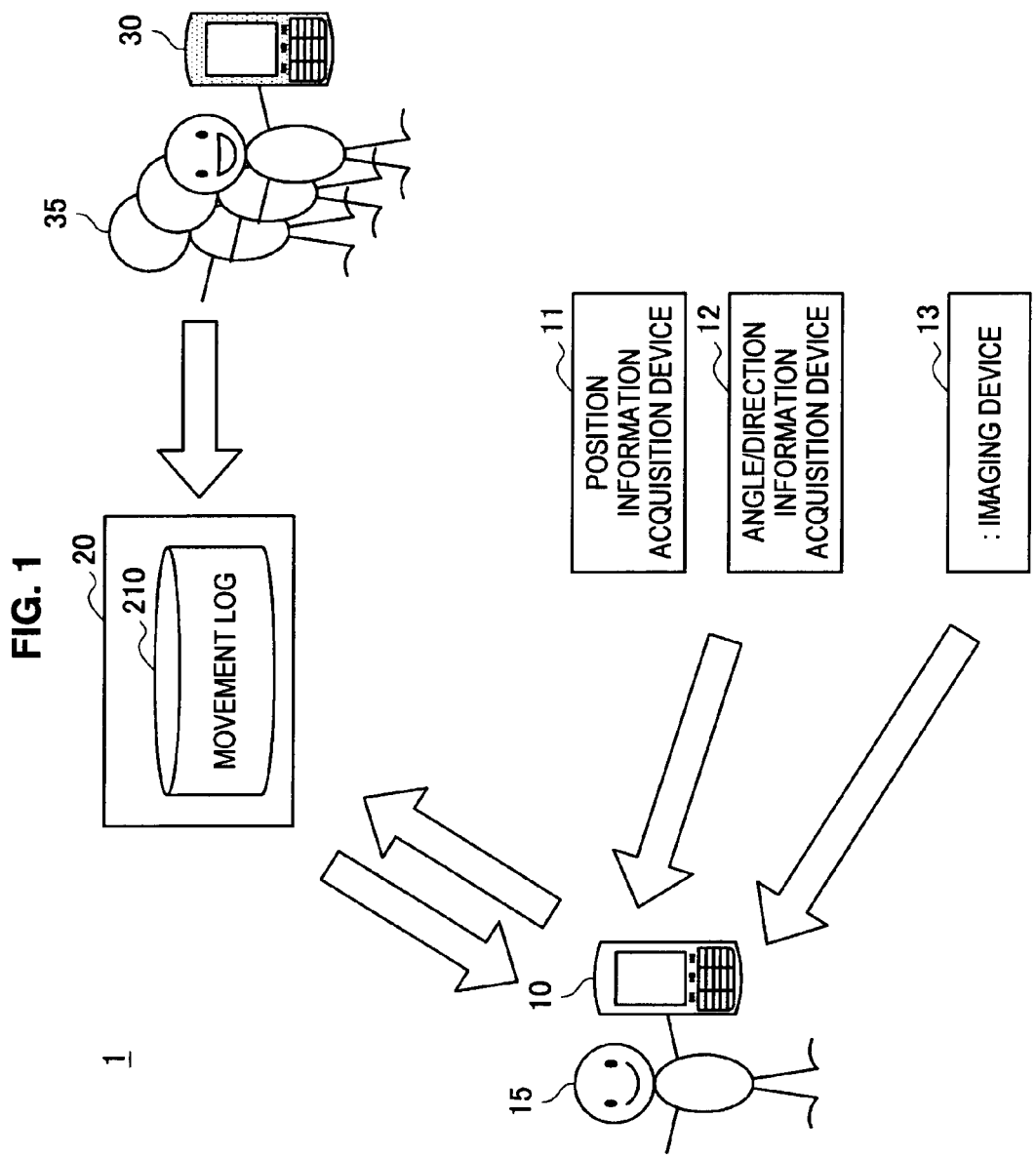
FIG. 1 is an explanatory view illustrating an outline of a community generation system according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "preferred embodiment of the present invention" will be described in the following order.
[1] Object of present embodiment
[2] Outline of community generation system
[3] Hardware configuration of mobile terminal
[4] Functional configurations of mobile terminal and server device
[5] Details of community information generation and display processing in mobile terminal
[6] Generation of community information in server device
[1] Object of Present Embodiment Lately, SNS is becoming widespread, which is a web site of community type which promotes and supports the interactions of people with each other. In the case of establishing a community place such as SNS on a network, a user creates a community by, for example, releasing his/her own profile or photograph, registering a friend, and setting a viewing limitation.

Further, as part of augmented reality, there is performed processing of superimposing additional information of the created community or the like on a photographed image. In performing the processing, there are many cases where it becomes a focus that how well the additional information is superimposed without feeling of strangeness on a video of the real world. That is, the following methods become main appeal points in order that the additional information such as superimposed image is not seen as dented from an object of the real world: a method involving accurately determining a position/angle/direction of a camera; and a method involving recognizing an object within a photographed image. In this case, it becomes an issue that what kind of information is superimposed on the photographed image and from where the information is obtained.

In the case of establishing the community place, however, it was necessary for the user to explicitly create the community. Accordingly, in order to create many small and closed communities for an event, there was an issue that a large amount of labor, such as input of a community title or setting of participant limitation, was necessary. Consequently, taking the above circumstances into consideration, a community generation system 1 according to an embodiment of the present invention was produced. By the use of the community generation system according to the present embodiment, a community can be easily generated based on a movement log of a user. Further, by automatically superimposing the generated community information on a peripheral image of the mobile terminal possessed by the user, it becomes possible to easily recognize the generated community.

[2] Outline of Community Generation System

Next, an outline of the community generation system 1 will be described with reference to FIG. 1. FIG. 1 is an explanatory view illustrating the outline of the community generation system 1. The community generation system 1 mainly includes a mobile terminal 10, a server device 20, a mobile terminal 30, and the like. The mobile terminal 10 refers to an information processing terminal possessed by the user, and examples thereof include information processing terminals each provided with a display device, such as a cellular phone, a PDA (Personal Digital Assistant), and a laptop PC (Personal Computer).

Further, the mobile terminal 10 is connected to the server device 20 via a network. The network is a communication line network that makes the mobile terminal 10 and the server device 20 communicable with each other, which includes a public line network such as an Internet, a telephone line network, and a satellite communication network, and a leased line network such as WAN, LAN, and IP-VPN, and which may be wired or wireless.

The mobile terminal 10 acquires movement information which includes position information and time information at which the position information is acquired, and transmits the movement information to the server device 20 at a predetermined interval. Further, the mobile terminal 10 receives, from the server device 20, community information which is generated based on the movement information, and displays the community information on a display screen of the mobile terminal 10.

The server device 20 refers to an information processing device which is connected to the mobile terminal 10 or the mobile terminal 30 via a network and performs transmission/reception of data. The server device 20 accumulates the movement information acquired by a plurality of mobile terminals such as the mobile terminal 10 and the mobile terminal 30 via a network and stores a history of the movement information. The server device 20 generates community information based on the history of the movement information. The community information refers to information which can be shared between a user possessing the mobile terminal 10 and a user other than the user possessing the mobile terminal 10, and refers to community information which is linked to, for example, a position, a time, or a person.

The mobile terminal 30 also transmits movement information to the server device 20 at a predetermined interval via a network in the same manner as the mobile terminal 10. For example, in the case where the user of the mobile terminal 10 passes through a certain place in a certain time period and the user of the mobile terminal 30 also passes through the vicinity of the place where the mobile terminal 10 passes through in the same time period, community information linked to the place is generated. In addition, community information may be generated in the case where the user of the mobile terminal 10 and the user of the mobile terminal 30 are friends. Further, the community information includes position information, time information, a movement log of the user, word-of-mouth information, and the like.

Further, as described above, the community information transmitted from the server device 20 is displayed on the display screen of the mobile terminal 10. The community information may be displayed in a superimposed manner on a peripheral image of a mobile terminal. For example, angle/direction information of the mobile terminal 10 may be acquired, an azimuth at which the mobile terminal 10 is located may be calculated, and community information including position information of the azimuth may be superimposed on a peripheral image of the mobile terminal. In the above, the outline of the community generation system 1 has been described.

[3] Hardware Configuration of Mobile Terminal

Figure 2:
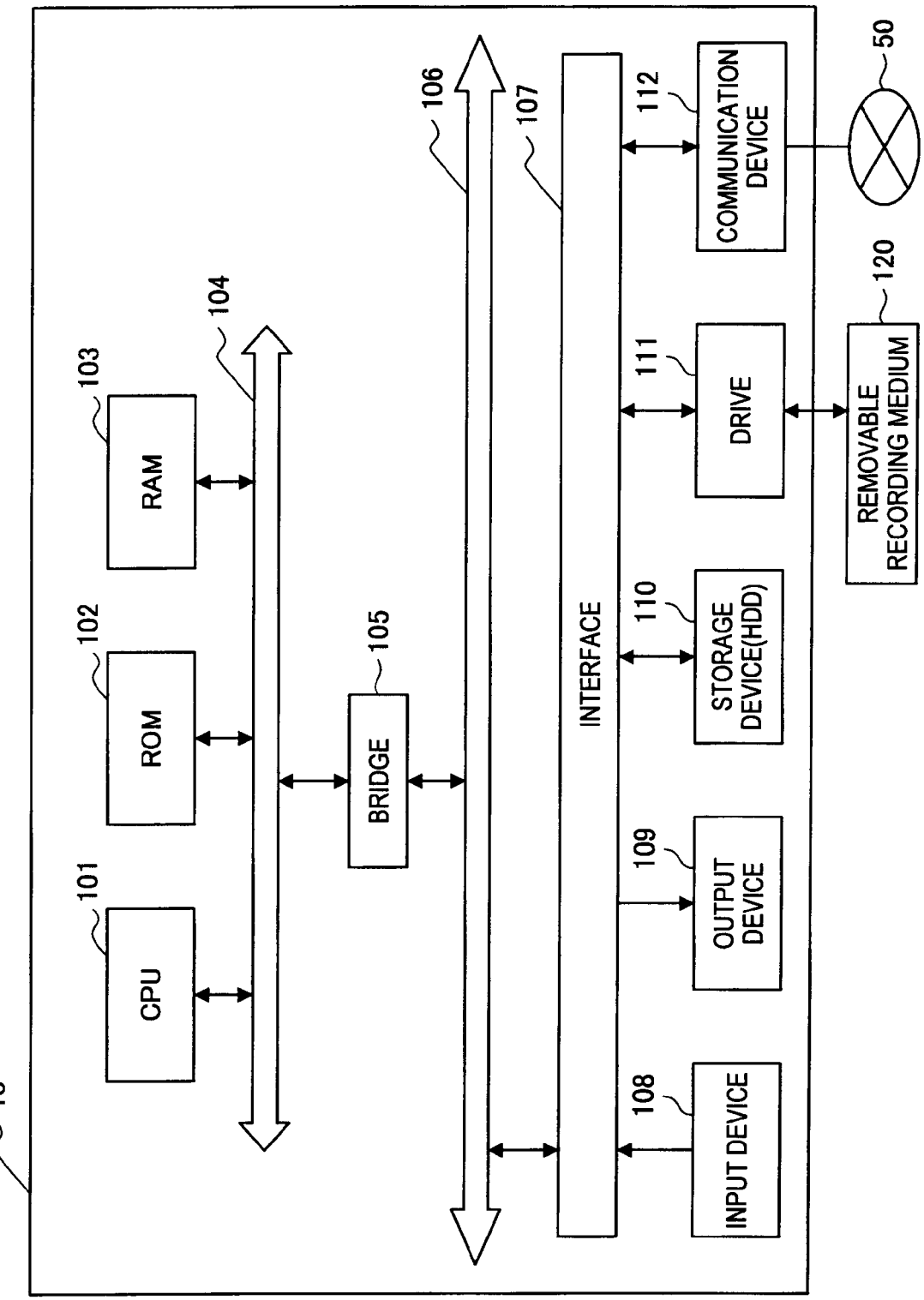
FIG. 2 is a block diagram showing a hardware configuration of a mobile terminal according to the embodiment.

Next, a hardware configuration of the mobile terminal 10 will be described with reference to FIG. 2. FIG. 2 is a block diagram showing the hardware configuration of a mobile terminal 10. The mobile terminal 10 includes a CPU (Central Processing Unit) 101, an ROM (Read Only Memory) 102, an RAM (Random Access Memory) 103, a host bus 104, a bridge 105, an external bus 106, an interface 107, an input device 108, an output device 109, a storage device (HDD) 110, a drive 111, and a communication device 112.

The CPU 101 functions as an arithmetic processing unit and a control unit, and controls an entire operation of the mobile terminal 10 in accordance with various kinds of programs. Further, the CPU 101 may be a microprocessor. The ROM 102 stores a program, a calculation parameter, and the like that the CPU 101 uses. The RAM 103 temporarily stores a program used for execution of the CPU 101, a parameter that appropriately changes for the execution, and the like. Those are connected to each other by the host bus 104 including a CPU bus and the like.

The host bus 104 is connected to the external bus 106 such as a PCI (Peripheral Component Interconnect/Interface) bus via the bridge 105. It should be noted that the host bus 104, the bridge 105, and the external bus 106 do not necessarily have to be configured as separate components, and those functions may be implemented in one bus.

The input device 108 includes, for example, an input means for a user to input information, such as a mouse, a keyboard, a touch panel, a button, a microphone, a switch, and a lever, and an input control circuit which generates an input signal based on an input from the user and outputs the input signal to the CPU 101. The user of the mobile terminal 10 can input various kinds of data and can instruct a processing operation to the mobile terminal 10 by operating the input device 108.

The output device 109 includes, for example, a display device such as a CRT (Cathode Ray Tube) display device, an LCD (liquid crystal display) device, an OLED (Organic Light Emitting Display) device, and a lamp, and an audio output device such as a speaker and headphones. The output device 109 outputs, for example, reproduced content. Specifically, the display device displays various kinds of information such as reproduced image data in a form of text or image. On the other hand, the audio output device converts reproduced audio data or the like into sound and outputs the sound.

The storage device 110 is a device for storing data, which is configured as an example of a storage section of the mobile terminal 10 of the present embodiment. The storage device 110 may include, for example, a storage medium, a recording device for recording data in the storage medium, a reading device for reading out the data from the storage medium, and a deletion device for deleting the data recorded in the storage medium. The storage device 110 is configured to include, for example, an HDD (Hard Disk Drive) and an SSD (Solid State Drive). The storage device 110 drives a hard disk and stores a program and various kinds of data executed by the CPU 101. Further, the storage device 110 stores an item, an identification number, and the like, which are to be described later.

The drive 111 is a reader/writer for the storage medium and is built in or externally attached to the mobile terminal 10. The drive 111 reads out information recorded in a removable storage medium 120 which is mounted thereto, such as a magnetic disk, an optical disk, a magneto-optical disk, or a semiconductor memory, and outputs the information to the RAM 103.

The communication device 112 refers to a communication interface which is configured to include, for example, a communication device for establishing a connection with a communication network 50. Further, the communication device 112 may be a wireless LAN (Local Area Network) enabled communication device, a wireless USB enabled communication device, or a wired communication device for performing wired communication.

In the above, the example of the hardware configuration of the mobile terminal 10 has been described with reference to FIG. 2. The server device 20 can also have substantially the same hardware configuration as the hardware configuration of the mobile terminal 10, and hence, the description thereof is omitted.

[4] Functional Configurations of Mobile Terminal and Server Device

Figure 3:
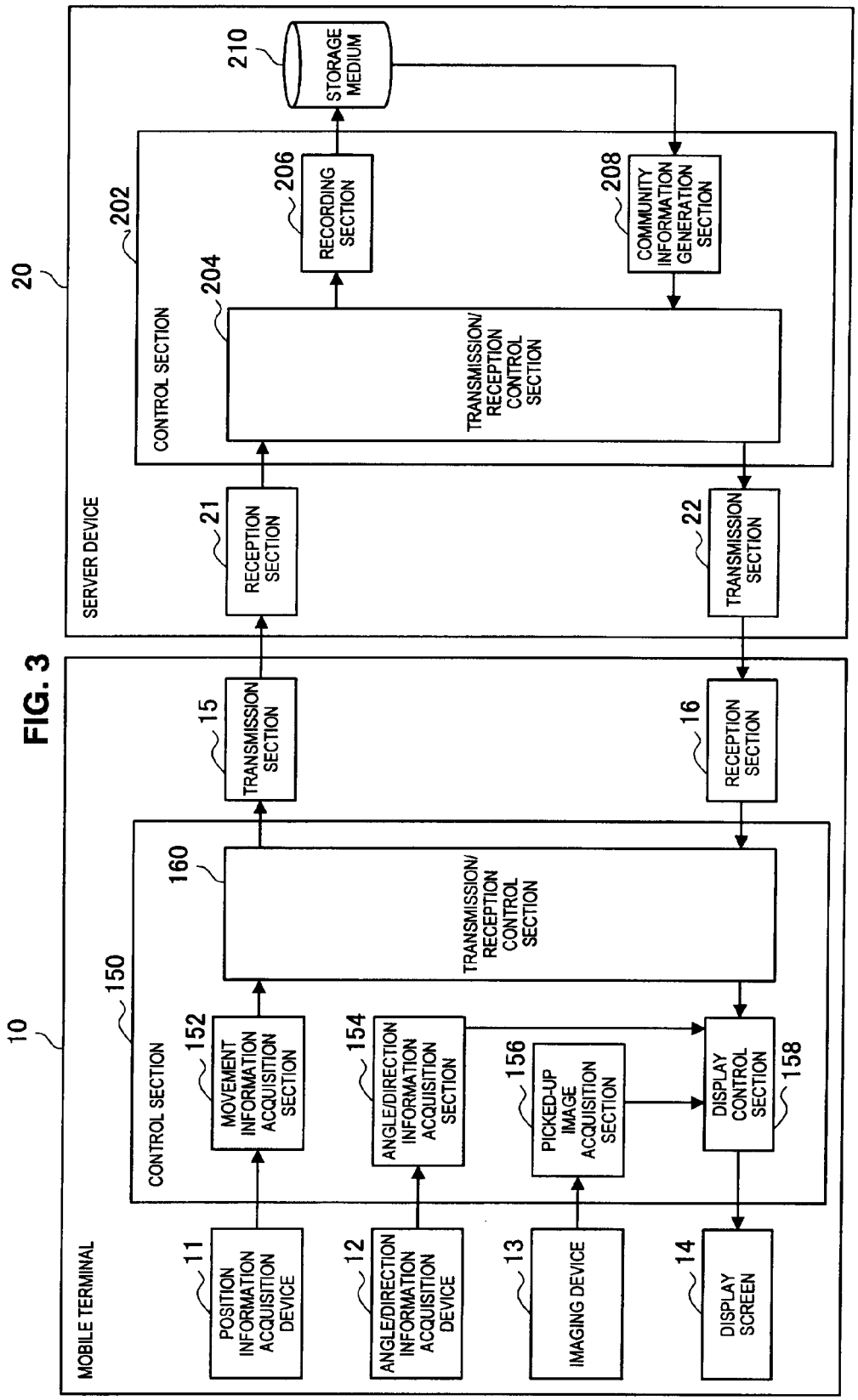
FIG. 3 is a block diagram showing functional configurations of the mobile terminal and a server device according to the embodiment.

Next, functional configurations of the mobile terminal 10 and the server device 20 will be described. In describing the functional configurations shown in FIG. 3, FIGS. 4 to 6 are used as appropriate. FIG. 3 is a block diagram showing the functional configurations of the mobile terminal 10 and the server device 20. As shown in FIG. 3, the mobile terminal 10 mainly includes a position information acquisition device 11, an angle/direction information acquisition device 12, an imaging device 13, a display screen 14, a transmission section 15, a reception section 16, and a control section 150.

The position information acquisition device 11 has a function of specifying current position information of a user. The position information acquisition device 11 specifies the position information by using a position information system such as GPS (Global Positioning System) and PlaceEngine (registered trademark).

GPS can specify the current position by using information sent by a GPS satellite, and can acquire information such as latitude/longitude. Further, GPS refers to a system which specifies position information mainly in the case where the mobile terminal is placed outdoors.

PlaceEngine (registered trademark) can specify a current position by using radio waves from the wireless LAN. That is, because PlaceEngine uses electrical measurement information from an access point of the wireless LAN, even a position at a place where GPS does not function, such as indoor place or an underground mall, can be specified.

The mobile terminal 10 in which PlaceEngine (registered trademark) is mounted transmits Wi-Fi electrical measurement information such as a MAC address and an electric field intensity to a PlaceEngine server. Then, the PlaceEngine server estimates position information from the received Wi-Fi electrical measurement information and a database of Wi-Fi electrical measurement information which has been accumulated beforehand and transmits the position information to the mobile terminal 10. The position information transmitted from the PlaceEngine server includes latitude/longitude, address information, and the like. Consequently, it becomes possible to specify not only the latitude/longitude, but also the floor number information of a building.

The angle/direction information acquisition device 12 has a function of detecting an angle/direction of the mobile terminal 10 and a line of sight direction of the user. As a method of detecting the angle/direction of the mobile terminal 10, there is given a method involving using a terrestrial magnetism sensor, an inclination sensor, a gyro sensor, or the like to the mobile terminal 10 to thereby detect the angle/direction of the mobile terminal 10. Further, a direction in which the terminal is directed can be also detected by using an acceleration sensor. Further, as a method of detecting the line of sight direction of the user, there may given a method involving using a picked-up image of the imaging device 13 to be described later to thereby measure the line of sight direction of the user.

The imaging device 13 includes, for example, a lens section, a CCD, an analog signal processing section, an A/D conversion section, and a digital signal processing section, and has a function of acquiring a peripheral image of the mobile terminal 10. Further, the display screen 14 is an example of the above-mentioned output device 109, and has a function of outputting the peripheral image imaged by the imaging device 13 or an image in which community information is superimposed on the peripheral image.

The control section 150 is an example of the CPU 101, and includes a movement information acquisition section 152, an angle/direction information acquisition section 154, a picked-up image acquisition section 156, a display control section 158, a transmission/reception control section 160, and the like. The movement information acquisition section 152 acquires movement information such as the position information detected by the position information acquisition device 11 and time information, and provides the movement information to the transmission/reception control section 160. The position information acquired by the movement information acquisition section 152 refers to information which can specify a position such as latitude/longitude and address information as described above. Further, the time information refers to information of time at which the position information is detected. Further, there may be included information indicating a measurement method for the position information, such as whether it is the position information acquired by GPS or the position information acquired by PlaceEngine (registered trademark).

The angle/direction information acquisition section 154 acquires the angle/direction information detected by the angle/direction information acquisition device 12, and provides the angle/direction information to the display control section 158. Further, the picked-up image acquisition section 156 acquires the peripheral image of the mobile terminal 10 imaged by the imaging device 13 and provides the peripheral image to the display control section 158.

The display control section 158 has a function of controlling the display of the image or the content displayed on the display screen 14. Specifically, the display control section 158 displays, on the display screen, a displayed image included in the community information in a superimposed manner on the peripheral image acquired by the picked-up image acquisition section 156, based on the angle/direction information provided from the angle/direction information acquisition section 154. For example, in the case where the angle/direction information refers to information which indicates a predetermined direction, the display control section 158 displays community information including information of the direction in an superimposed manner on an appropriate position of the displayed image. As the community information superimposed on the displayed image, text information and illustration can be exemplified. As for the display of the community information on the display screen, detailed description will be given later.

The transmission/reception control section 160 has a function of controlling the transmission/reception of data performed via the transmission section 15 and the reception section 16. Specifically, the transmission/reception control section 160 provides the movement information provided from the movement information acquisition section 152 to the transmission section 15, and provides community information transmitted from the server device 20 via the reception section 16 to the display control section 158.

The transmission section 15 and the reception section 16 are each an example of the communication device 112. The transmission section 15 transmits the position information and the like provided from the transmission/reception control section 160 to the server device 20, and the reception section 16 receives the community information and the like transmitted from the server device 20.

Here, the community information transmitted from the server device 20 will be described. The community information transmitted from the server device 20 refers to information generated based on a history of the movement information transmitted from the mobile terminal 10. As described above, the server device 20 accumulates not only the history of the movement information of the mobile terminal 10, but also a history of movement information of a mobile terminal possessed by a user other than the user possessing the mobile terminal 10. The community information refers to information which can be shared between the user possessing the mobile terminal 10 and the user other than the user possessing the mobile terminal 10, and refers to community information which is linked to, for example, a position, a time, or a person.

The community information refers to, in the case where the history of movement information is common to the user and the other user, information generated by using the common history of movement information. For example, in the case where the user of the mobile terminal 10 passes through a certain place in a certain time period and the user of a mobile terminal other than the mobile terminal 10 also passes through the vicinity of the place where the mobile terminal 10 passes through in the same time period, it is determined that the history of movement information is common to the mobile terminal 10 and the user of the mobile terminal other than the mobile terminal 10, then community information linked to the place where the users has passed through and to the time period is generated.

Further, the history of the movement information of the other user, which is used for generating the community information, refers to a history of movement information of a user having the common attribute to the user possessing the mobile terminal 10 or of a user who has been registered beforehand. The user who has been registered beforehand refers to, for example, a user having a friend relationship with the user. The attribute information and the friend relationship of the user are registered beforehand in the server device 20. As the attribute of the user, there can be registered, for example, whether the user is an employee or a student, a group to which the user belongs, a place of employment of the user, and the like. Further, the friend relationship may be determined based on an address book which is registered by the input of the user of the mobile terminal 10.

In addition, the history of the movement information of the other user, which is used for generating the community information, refers to a history of movement information which can be opened to the public. The user of the mobile terminal 10 can set beforehand whether the history of the movement information can be opened to the public or not via the mobile terminal 10. Whether to open the history to the public or not may be set with respect to each place and to each time period. For example, the user performs setting beforehand, via the mobile terminal 10, in such a manner that the history of the movement information is closed to the public during a specific time period on a specific day of the week.

In addition, another user to which the history can be opened may be designated. For example, in the case where the user moves inside the user's office building, the movement information may be opened to a user of the same office. Further, movement information on a holiday may be set so as to be closed to the user of the same office.

As seen from the above, the community information which is generated in the server device 20 and is transmitted to the mobile terminal 10 refers to the information generated by taking into consideration not only whether the movement information such as time period and position information is common between the users, but also the attributes of and the friend relationship between the users and, in addition, whether the movement information of a target user can be opened to the public or not.

Further, a community may be generated based on position information included in a predetermined position area. The position area may be determined depending on, for example, characteristics of a corresponding place. For example, in the case where the corresponding place is a building, a community may be generated in such a manner that the position area is limited to a certain floor of the building, and in the case where the corresponding place is a site at which an event or the like takes place, a community may be generated within a wide position area.

Further, the position area in which a community is generated may be determined depending on a measurement method. For example, in the case where the movement information is acquired by GPS, the community may be generated within a wide position area, and in the case where the movement information is acquired by PlaceEngine (registered trademark), the community may be generated within a small position area.

Generally, in order to generate the closed community as described above, it was necessary to perform generation of the title, registration of the users, selection of a range of the target users, and the like, which required a large amount of labor. However, according to the present embodiment, as described above, it becomes possible to receive the community information generated based on the movement information without performing troublesome input, by each user performing settings with respect to predetermined items.

The community information transmitted from the server device 20 may be not only information of a newly generated community, but also information of an already generated community. For example, in the case where a community linked to a predetermined place of a predetermined time is already generated, information of the community may be transmitted from the server device 20. In addition, in the case where information of a community of an event or the like that is to be held is already generated based on position information, the information of the community may be transmitted from the server device 20. In the above, the functional configuration of the mobile terminal 10 has been described.

Next, a functional configuration of the server device 20 will be described. As shown in FIG. 3, the server device 20 includes a reception section 21, a transmission section 22, a control section 202, a storage medium 210 and the like. The reception section 21 refers to a communication interface which is configured to include a communication device or the like, and has a function of receiving the movement information transmitted from the mobile terminal 10. Further, the reception section 21 receives, also from a mobile terminal other than the mobile terminal 10, movement information that is acquired by such other mobile terminal. The transmission section 22 refers to a communication interface which is configured to include a communication device or the like, and has a function of transmitting various kinds of information such as community information to the mobile terminal 10.

The control section 202 includes a transmission/reception control section 204, a recording section 206, a community information generation section 208, and the like. The transmission/reception control section 204 has a function of controlling the transmission/reception of data performed via the reception section 21 and the transmission section 22. Specifically, the transmission/reception control section 204 provides the movement information of the mobile terminal 10 transmitted from the mobile terminal 10 via the reception section 21 to the recording section 206, and provides community information provided from the community information generation section 208 to the transmission section 22.

The recording section 206 has a function of accumulating a history of the movement information of the mobile terminal 10 provided by the transmission/reception control section 204 and recording the history in the storage medium 210. As described above, in the case where pieces of movement information are transmitted from a plurality of mobile terminals to the server device 20, the recording section 206 accumulates the history of the movement information of the mobile terminal with respect to each user and record the history in the storage medium.

The storage medium 210 is configured to include, for example, an HDD (Hard Disk Drive), and stores the history of the movement information of the mobile terminal 10, the attribute information of the user, and the community information generated by the community information generation section 208 to be described later. Here, recorded contents recorded in the storage medium 210 will be described with reference to FIGS. 4 to 6. FIG. 4 is an explanatory view illustrating a history of movement information recorded in the storage medium 210.

As shown in FIG. 4, a history 301 of movement information recorded in the storage medium 210 includes, for example, a date and time 3010, a measurement method 3011, a latitude 3012, and a longitude 3013. The date and time 3010 refers to a date on and a time at which the movement information is acquired. Further, there may be recorded a day of the week along with the date and time. The measurement method 3011 refers to information indicating a measurement method of the movement information, and to information indicating whether the information is acquired by GPS or by PlaceEngine (registered trademark). In the case where pieces of movement information are transmitted from mobile terminals possessed by a plurality of users, the history 301 of movement information with respect to each user shown in FIG. 4 is recorded.

Further, in the case where the movement information is acquired by PlaceEngine (registered trademark), information indicating an address may be recorded in addition to the latitude 3012 and the longitude 3013. In addition, information indicating a number of floors of a building may be recorded.

Next, the attribute information and the like of the user which are registered beforehand are described with reference to FIG. 5. FIG. 5 is an explanatory view illustrating a content of attribute information 302 of a user. The attribute information 302 of a user includes a user name 3021, an attribute of the user 3022, a friend 3023, a participating community 3024, information accessible to others 3025, limitation to accessibility 3026, and the like. For example, as for a user A, the following are registered beforehand: the attribute is "employee", the friends are "C and E", the participating communities are "community 1, community 2, and community 3", the information accessible to others is "attribute, friend, participating community, and movement information", and the limitation to accessibility is "no limitation".

Referring back to FIG. 3, the community information generation section 208 has a function of generating community information which can be shared between one user and another user, based on the history of the movement information stored in the storage medium 210. As described above, in the case where the history of movement information is common to the one user and the other user, the community information generation section 208 generates the community information by using the common history of movement information. The community information generation section 208 generates the community information by referring to the history 301 of movement information shown in FIG. 4 and the attribute information 302 of a user shown in FIG. 5.

Here, the community information generated by the community information generation section 208 will be described with reference to FIG. 6. FIG. 6 is an explanatory view illustrating the community information generated by the community information generation section 208. As shown in FIG. 6, community information 303 includes a community number 3031, a title 3032, a place 3033, a comment 3035, limitation to accessibility 3036, a registered user 3037, and the like. As shown in FIG. 6, for example, in the case where the user A is positioned at the fifth floor of Osaki building A between 9:00 and 10:00, the users C and E are also positioned at the fifth floor of Osaki building A, and the users A, C, and E are friends with each other, a community as shown in Community No. 2 is generated.

Referring back to FIG. 3, the community information generation section 208 which has generated community information provides the generated community information to the transmission/reception control section 204. In the above, the functional configuration of the server device 20 has been described.

Figure 7:
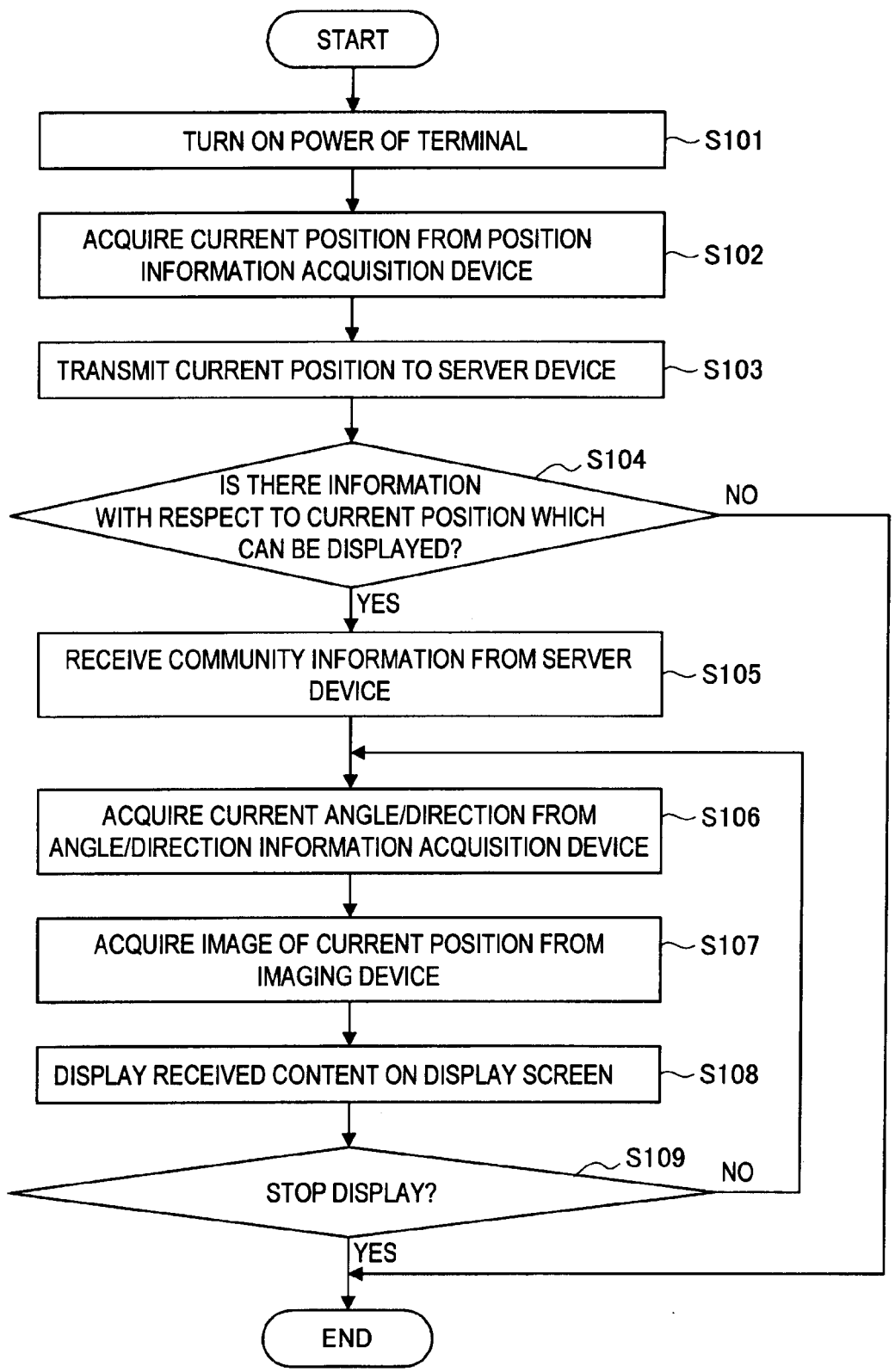
FIG. 7 is an explanatory view illustrating community information generation in the mobile terminal according to the embodiment.

[5] Details of Community Information Generation and Display Processing in Mobile Terminal Next, details of generation and display processing of community information in the mobile terminal 10 will be described with reference to FIGS. 7 to 11. FIG. 7 is an explanatory view illustrating community information generation in the mobile terminal 10. As shown in FIG. 7, first, the power of the mobile terminal 10 is turned on (S101). Then, the movement information acquisition section 152 acquires a current position from the position information acquisition device 11 (S102).

Next, the transmission section 15 transmits the current position acquired in Step S102 to the server device 20 (S103). The processing in Step S102 and Step S103 may be executed regularly at a predetermined interval during the time in which the power of the mobile terminal 10 is turned on.

It is determined whether there is information with respect to the current position transmitted in Step S103 which can be displayed on the display screen of the mobile terminal 10 (S104). The determination in Step S104 may be performed by the control section of the mobile terminal 10, and the result determined in the server device 20 may be received by the mobile terminal 10. Further, the mobile terminal 10 may inquire to the server device 20 whether there is information with respect to position information which can be displayed and may receive the determination result from the server device 20. The processing in Step S104 may be executed in the case where the user explicitly performs some operation for acquiring information related to the current position. Consequently, the processing from Step S105 onward is performed according to an explicit operation by the user.

In the case where it is determined that there is information with respect to the current position which can be displayed in Step S104, community information is received from the server device 20 (S105). Next, the angle/direction information acquisition section 154 acquires a current angle/direction from the angle/direction information acquisition device 12 (S106). After that, the picked-up image acquisition section 156 acquires an image of the current position from the imaging device 13 (S107).

Next, the display control section 158 displays the community information received in Step S105 on the display screen (S108). At the time of displaying the community information on the display screen in Step S108, the display control section 158 displays the community information in a superimposed manner on the image of the current position acquired in the Step S107, based on the current angle/direction acquired in the Step S106. Then, according to the operation by the user, it is determined whether to stop displaying the community information (S109). In the case where it is determined to stop displaying the community information by a key operation or the like of the user in Step S109, the processing is completed. On the other hand, in the case where it is determined not to stop displaying the community information, the processing from Step S106 to Step S108 is repeated.

Figure 8:
FIG. 8 is an explanatory view illustrating a display example of the community information according to the embodiment.
Figure 9:
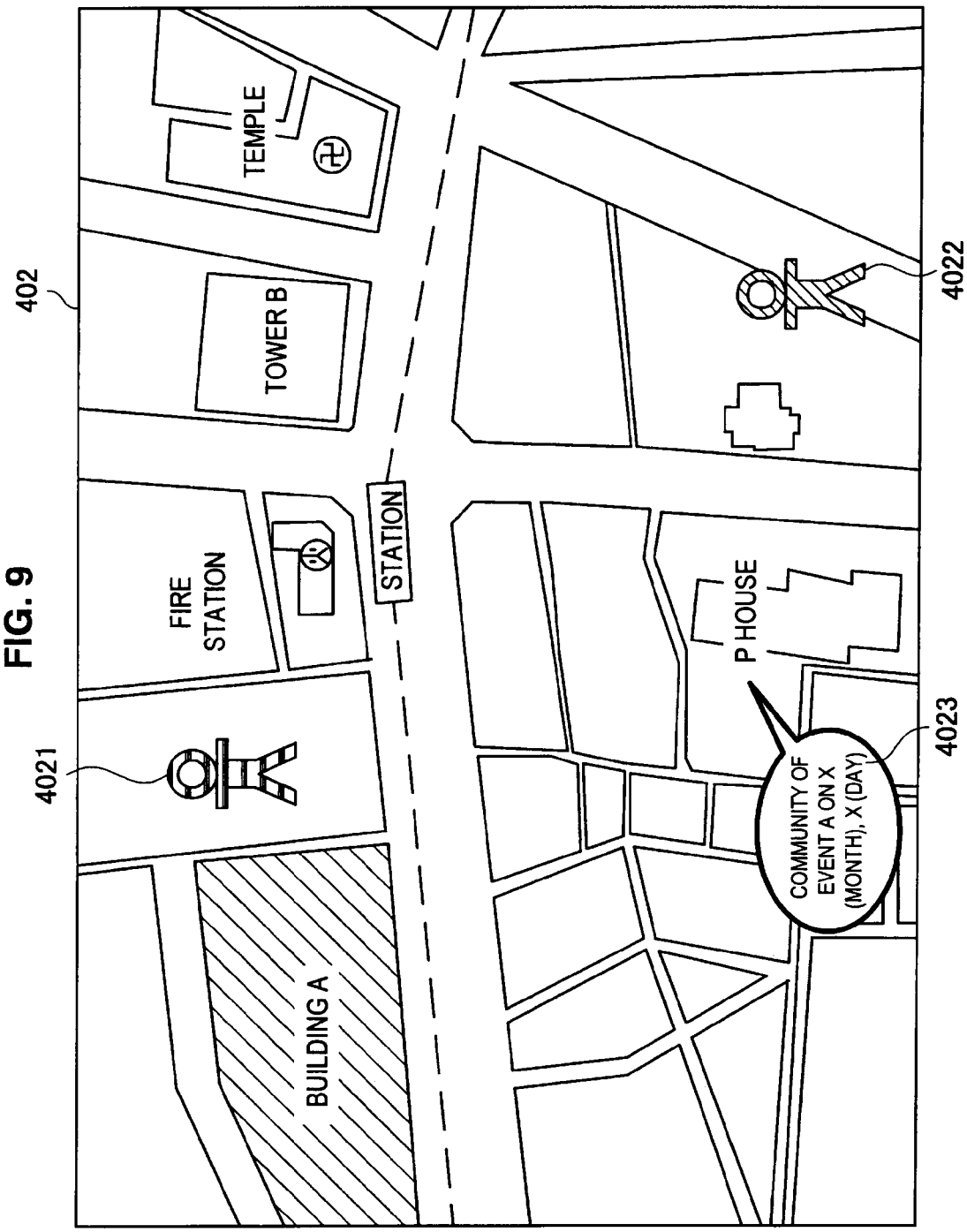
FIG. 9 is an explanatory view illustrating a display example of the community information according to the embodiment.

Here, a display example of the community information displayed on the display screen in Step S107 will be described with reference to FIGS. 8 and 9. FIGS. 8 and 9 are each an explanatory view illustrating the display example of the community information. As shown in FIG. 8, in a display example 401, community information is superimposed on a peripheral image of the mobile terminal 10 which is imaged by the imaging device 13. For example, in the display example 401, position information 4010 of a friend of the user of the mobile terminal 10, who is in the vicinity of the mobile terminal 10, is displayed in a figure. Further, community information 4012, which has already been created, is displayed as text information. Still further, there may also be superimposed on the peripheral image a movement log 4013 of a person who has recently passed through the vicinity of the place. As shown in FIG. 8, the movement log 4013 may be shown as footprints. Further, when the footprint on the screen is selected by the user's operation, information indicating a person to whom the movement log belongs may be displayed as well.

In the image of the display example 401 in FIG. 8, it can be visually confirmed that the friend who is displayed in a figure is positioned at a predetermined floor of a building. Thus, the real world can be extended by taking into account the angle/direction information of the mobile terminal 10 and superimposing the community information on the peripheral image to thereby superimpose a virtual world on the image of the real world.

Further, as shown in a display example 402 of FIG. 9, a map showing the vicinity of the current position of the user who possesses the mobile terminal 10 may be displayed on the display screen, and the community information may be superimposed on the map. For example, in the display example 402, a current position 4021 of the user of the mobile terminal 10 and a current position 4022 of a friend of the user of the mobile terminal 10 are superimposed on the map. Further, community information 4023, which has already been created, may be displayed as text information. Thus, when the community information is superimposed on the map showing the periphery of the mobile terminal 10, it becomes possible for the user to readily obtain information with added value while keeping track of the surroundings.

Figure 10:
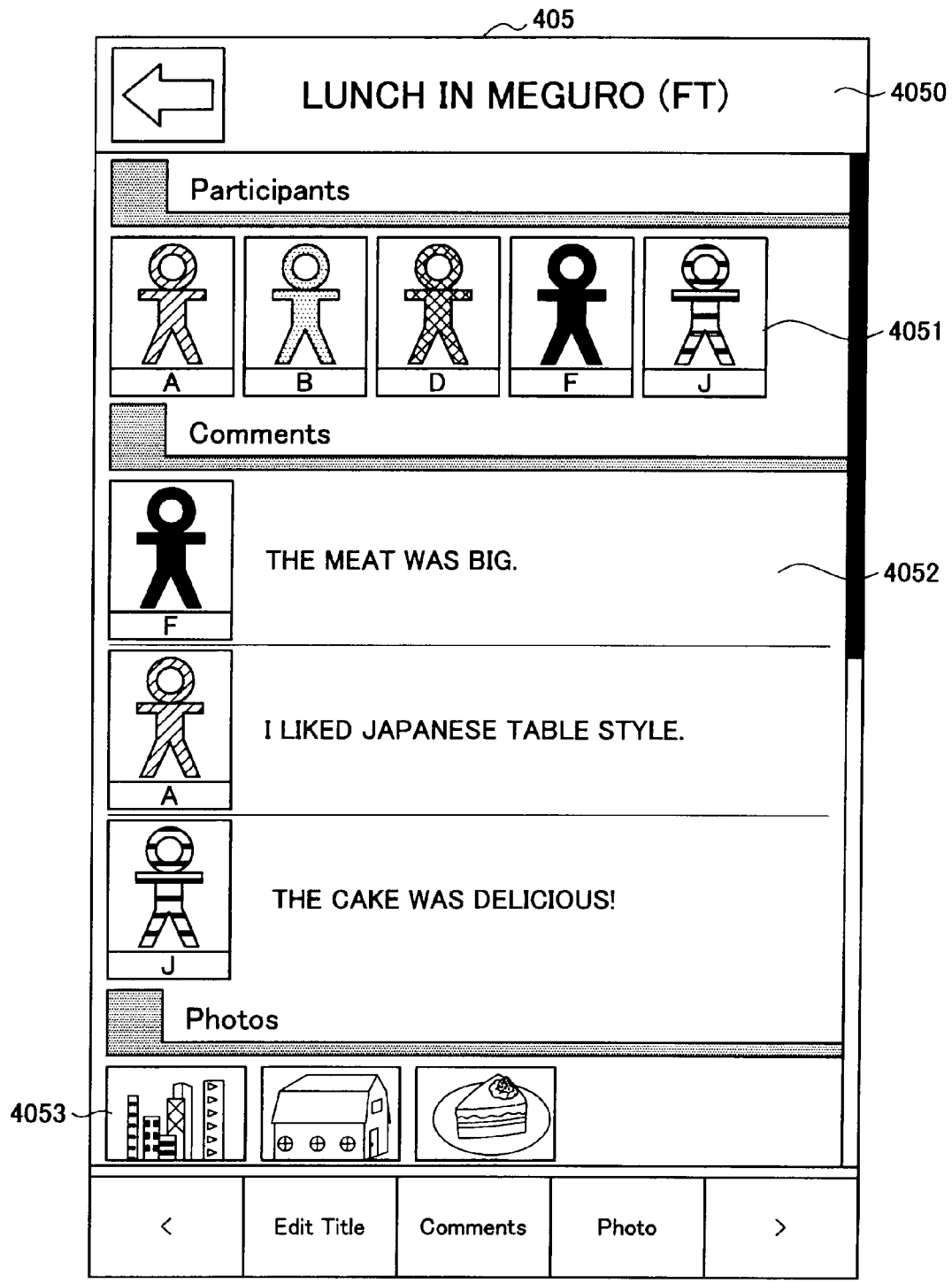
FIG. 10 is a display example of the detail of the displayed community information according to the embodiment.

Further, the detail of the community information displayed on the display screen is shown in a display example 405 of FIG. 10. FIG. 10 is a display example of the detail of the displayed community information. As shown in FIG. 10, the detail of the community information generated by the server device 20 is displayed by including a community title 4050, a community participant 4051, a posted comment 4052, a posted photograph 4053, and the like. The detail of the community information may also be displayed by, for example, in the display example shown in FIG. 8 or 9, selecting the text information or the illustration which shows the community information. Thus, it becomes possible for the user to obtain the detail of the community information in which the user is interested by an easy method.

Figure 11:
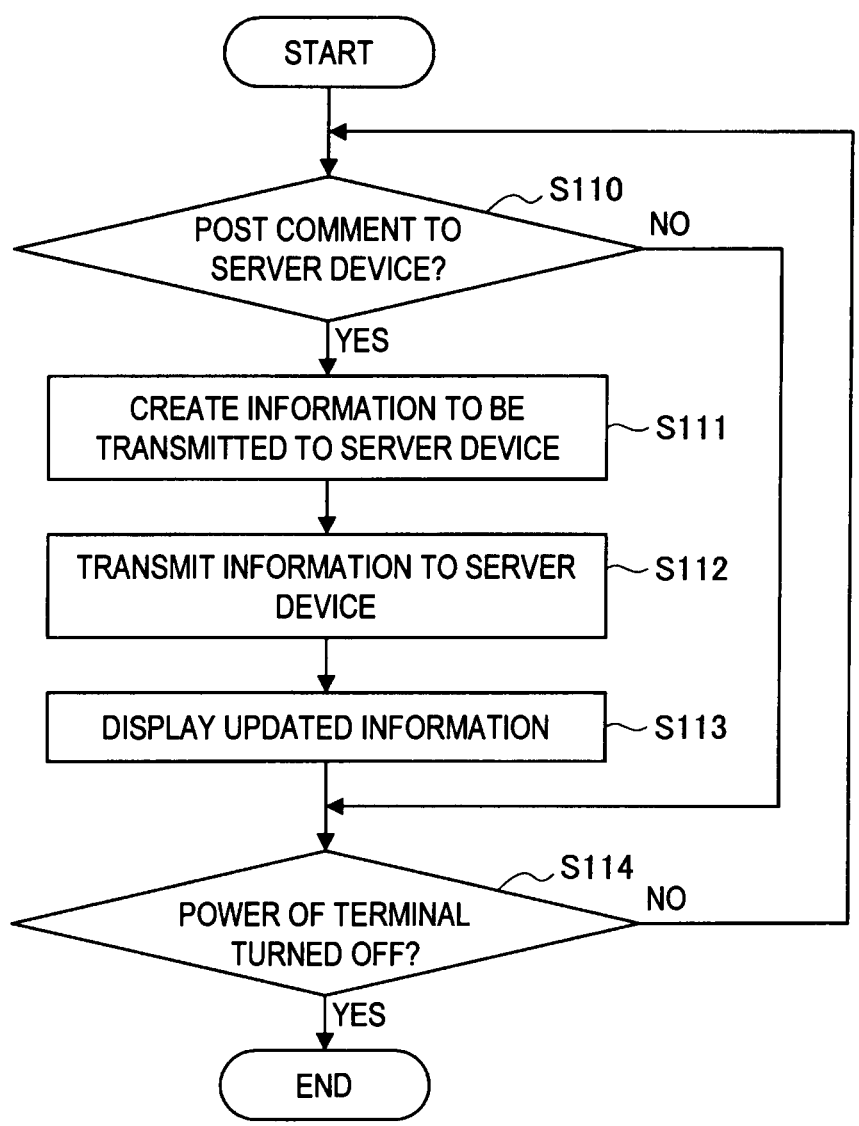
FIG. 11 is a flowchart showing a posting on the community information in the mobile terminal according to the embodiment.

Next, a posting on the community information in the mobile terminal 10 will be described with reference to FIG. 11. As shown in FIG. 11, the user of the mobile terminal 10 determines whether to post a comment on a server device (S110). In Step S110, it is determined whether to perform some kind of operation to the information on which the community information is superimposed. The some kind of operation refers to the confirmation of detailed information with respect to the information superimposed on the peripheral image or on the peripheral map, or to the posting of a still image or the posting of a comment with respect to the community.

In Step S110, in the case where it is determined that there is some kind of user's operation with respect to the community, information to be transmitted to the server device is created based on the user's operation (S111). In Step S110, in the case where it is determined that there is no user's operation with respect to the community, the processing of Step S114 is performed. Then, the information created in Step S111 is transmitted to the server device 20 (S112). In Step S112, the community information is updated according to the content of the user's operation transmitted to the server device 20. Then, the updated community information is displayed on the display screen of the mobile terminal 10 (S113). After that, it is determined whether the power of the terminal is turned off (S114), and in the case where it is determined that the power of the terminal is not turned off, the processing from Step S110 to Step S113 is repeated. On the other hand, in Step S114, in the case where it is determined that the power of the terminal is turned off, the processing is completed.

[6] Generation of Community Information in Server Device

Figure 12:
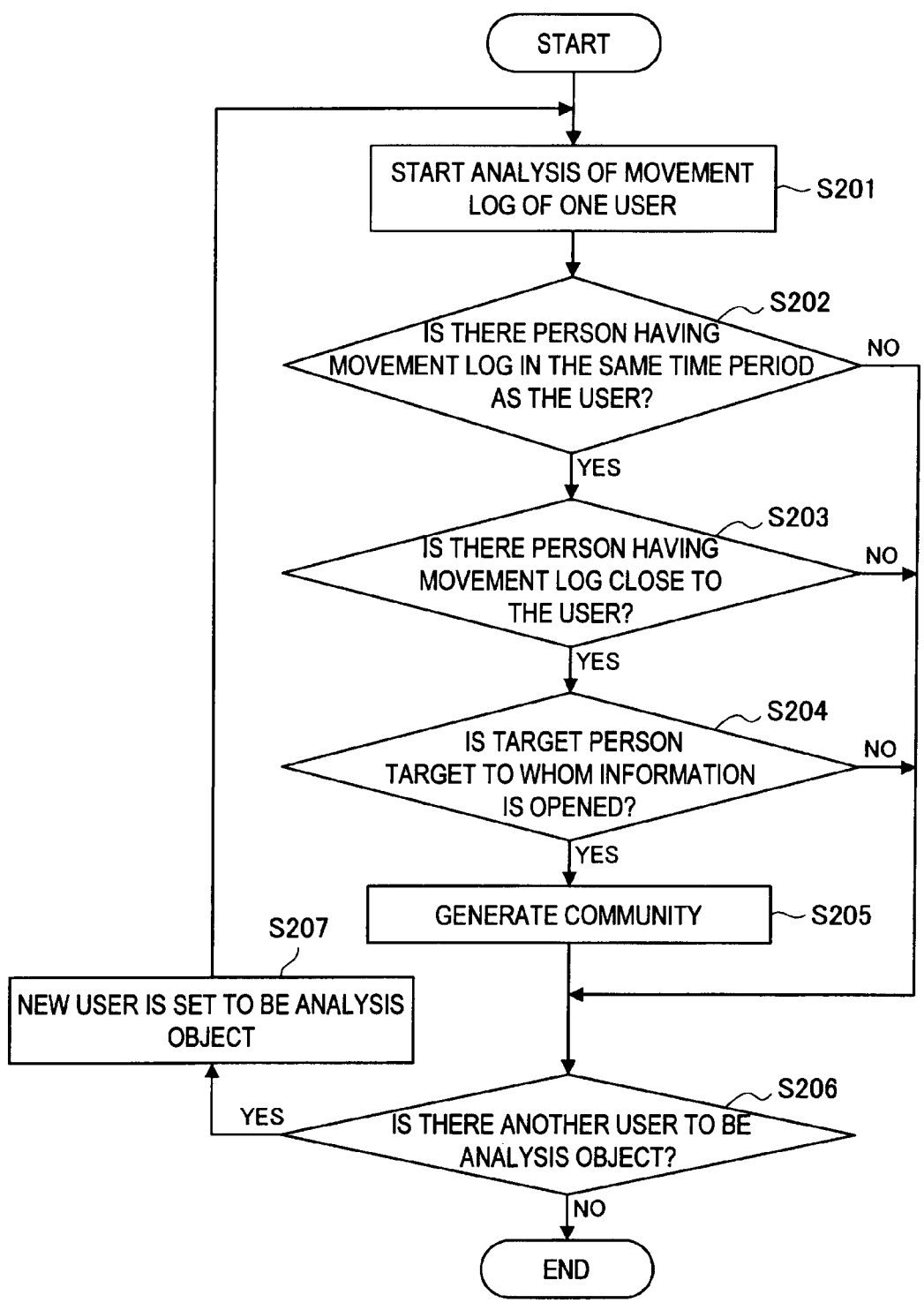
FIG. 12 is a flowchart showing generation of community information in a server device 20 according to the embodiment.

In the above, the details of the community information generation and display processing in the mobile terminal 10 has been described. Next, generation of community information in the server device 20 will be described with reference to FIG. 12. First, the community information generation section 208 of the server device 20 sets, from among movement logs (histories of pieces of movement information) of the plurality of users stored in the storage medium 210, a movement log of one user as an analysis object (S201).

With respect to the movement log of the one user which has been set in Step S201, it is determined whether there is another user having a movement log in the same time period as the movement log of the one user (S202). In Step S202, in the case where there is no user having a movement log in the same time period as the movement log of the one user, the processing of Step S206 is executed. The movement logs stored in the storage medium 210 may not be acquired at the same timing, and the intervals at which the movement logs are acquired may not be constant. Therefore, in order to determine whether or not the movement logs are in the same time period, it is necessary to make a determination by using pieces of time information of a successive plurality of movement logs. Further, in Step S202, the time period used for the determination may be limited to a predetermined range, or to a specific time period on a specific day of the week.

In Step S202, in the case where there is another user having a movement log in the same time period as the movement log of the one user, it is determined whether there is a user having a movement log closer to the movement log of the one user (S203). In Step S203, in the case where there is no user having a movement log closer to the movement log of the one user, the processing of Step S206 is executed.

In Step S203, the positional accuracy of the movement log differs depending on a measurement method for acquiring the movement information. For example, in the case where the measurement is performed by GPS, an error of several meters to several tens of meters of is expected. On the other hand, in the case where an access point of wireless LAN such as PlaceEngine (registered trademark) is used for the determination of a position, the floor or the room of a building in which the user is positioned can be determined when the accuracy of the positional determination of the access point is high. Consequently, it becomes possible to generate more suitable community by flexibly changing a determination criterion of the users being positioned "close" to each other, depending on the kind of measurement device by which a movement log is acquired and whether or not the movement log is acquired.

For example, in the case where a mobile terminal determines the floor within a building on which another user is positioned by PlaceEngine (registered trademark), it is not determined that the users are positioned "close" to each other when the other user is somewhere within the building, and it is determined that the users are positioned "close" to each other when the other user and the user possessing the mobile terminal are on the same floor. Further, the determination criterion of "close" may be changed depending on not only the measurement method of the movement log, but also the characteristics of a measurement place. That is, in the case where a place at which the user possessing the mobile terminal is positioned is within a large area such as a park or an amusement park, and when the other user is positioned within the park or the amusement park, it is determined that the users are positioned "close" to each other. On the other hand, in the case where the user possessing the mobile terminal is positioned at a place which is partitioned, such as within a building, and when the other user is positioned at the same floor of the building, it is determined that the users are positioned "close" to each other.

In Step S203, in the case where it is determined that there is a user having a movement log close to the movement log of the one user, it is determined whether the user is a target of community generation of the one user (S204). In Step S204, in the case where the user is not a target of community generation, the processing of Step S206 is executed.

In Step S204, the case where the user being a target of community generation of the one user refers to the case where the user has performed a setting that the information of the user can be opened to the one user, and an example thereof includes the case where the one user has a friend relationship with the user. Thus, in the community generation, it becomes possible to generate a closed community without the user performing troublesome input, by limiting the user to be a target of the community generation.

Further, the limitation of users who can participate in a community may be common to all the communities to be generated or may be set with respect to each of the communities. For example, in the case where a friend's friend (stranger) has participated in an event, there are generated two communities, which are a community of oneself and the friend and a community of the friend and the friend's friend. In this case, when a community in which three people participate is to be generated, a limitation of people who can participate in the community may be set.

In addition, the community to be generated may refer to not only a closed community which is specialized in one user to be the analysis object, but also an open community in which all the users can participate. For example, there can be considered a community related to a shop, which is generated by the shop, and an open community without participation limitation, which is generated by input of another user other than the one user.

In Step S204, in the case where it is determined that the user is a target of community generation, a community linked to the time period and place in which the user has become a target, and to the user is generated (S205). For example, in the case where the time period is in a morning time period and the place is an office building, a community related to commuting or work may be generated, and in the case where the time period is in a lunch time period and the place is a restaurant, a community related to lunch may be generated.

The community generated in Step S205 is a closed community as mentioned above, and hence, a person who is accessible to the community is only a person who is a target of community generation. Being accessible to the community means viewing, editing, and the like of information of the generated community.

After the community is generated in Step S205, it is determined whether there exists a movement log of another user to be an analysis object (S206). In Step S206, in the case where it is determined that there is a user to be an analysis object, the new user is set to be an analysis object (S207), and the processing from Step S201 to Step S206 is repeated. In Step S206, in the case where it is determined that there is no user to be an analysis object, the processing is completed.

It should be understood by those skilled in the art that various modifications, combinations, sub-combinations and alterations may occur depending on design requirements and other factors insofar as they are within the scope of the appended claims or the equivalents thereof.

For example, in the embodiment described above, viewing and editing of the detail of community information are performed in the mobile terminal 10, but the embodiment of the present invention is not limited to those examples. For example, the detail of community information may be accessible from another device such as PC which is connectable to the server device 20. In this case, it becomes possible to more comfortably execute an operation with respect to the generated community, such as upload of a photograph or addition of a comment.

Further, as for the method of accessing the generated community, there can be considered the following methods in addition to the above-mentioned method involving selecting a community displayed on a peripheral image or a map. For example, a user may select a person with whom the user wants to review an event, in which the user participated with another user, from an address book (friend list) and may select a community linked to the person to thereby display the community. Further, a community may be selected from the community list to which the user belongs. For example, as items used for sorting communities in the community list, there can be given time, friend, position, number of participants, and updated community (community having posted comment). It is also possible to use each of those methods as a method of selecting an open community which has no limitation.

Further, respective steps included in the processing of the mobile terminal 10 and the server device 20 according to the present specification are not necessarily processed in chronological order in accordance with the flowcharts. That is, the respective steps included in the processing of the mobile terminal 10 and the server device 20 may include processing executed in a parallel manner or in an individual manner (for example, parallel processing or processing by using an object).

Further, it is also possible to create a computer program for causing hardware such as a CPU, an ROM, and an RAM built in the mobile terminal 10, the server device 20, or the like to realize a function equivalent to a function of the configuration of each of the mobile terminal 10 and the server device 20. Further, there is provided a storage medium in which the computer program is stored.

The present application contains subject matter related to that disclosed in Japanese Priority Patent Application JP 2009-140457 filed in the Japan Patent Office on Jun. 11, 2009, the entire content of which is hereby incorporated by reference.

What is claimed is:

1. A mobile terminal comprising:
    a movement information acquisition section for acquiring movement information of a mobile terminal possessed by a user;
    a picked-up image acquisition section for acquiring a peripheral image of the mobile terminal, the peripheral image being imaged by an imaging device;
    a transmission section for transmitting the movement information acquired by the movement information acquisition section to a server device connected to the mobile terminal via a network;
    a reception section for receiving community information generated by the server device, based on a history of movement information that is determined to be common to both the user possessing the mobile terminal and another user, the community information being sharable between the user possessing the mobile terminal and the other user; and
    a display control section for displaying, on a display screen, an image included in the community information received by the reception section, in a superimposed manner, on a peripheral image of the mobile terminal acquired by the picked-up image acquisition section,
    wherein a history of movement information of the mobile terminal user is switched from being inaccessible to accessible to at least one user belonging to a group of users associated with the mobile terminal user through a common entity, the switch happening at a time when the mobile terminal enters a structure usually occupied by members of the group during a certain time-span, the time of entry falling within the time-span, and the at least one user being present within the structure at the time of entry.

2. The mobile terminal according to claim 1,
    wherein the server device stores histories of movement information of a plurality of users other than the user possessing the mobile terminal.

3. The mobile terminal according to claim 1, wherein the movement information acquisition section acquires movement information including position information of the mobile terminal and time information at which the position information is acquired.

4. The mobile terminal according to claim 3, wherein, when a history of position information is common to the user possessing the mobile terminal and the other user, the community information is generated by the server device by using the common history of position information.

5. The mobile terminal according to claim 4, wherein the history of the movement information of the other user used for generating the community information is a history of the movement information of a user having at least one attribute in common with the user possessing the mobile terminal.

6. The mobile terminal according to claim 4, wherein the history of the movement information of the other user used for generating the community information is a history of the movement information of a registered user.

7. The mobile terminal according to claim 4, wherein the history of the movement information of the other user used for generating the community information is a history of the movement information which can be opened to the public.

8. The mobile terminal according to claim 4, wherein, when the position information included in a predetermined position area is common to the user possessing the mobile terminal and the other user, the community information is generated by the server device by using the common position information.

9. The mobile terminal according to claim 1, wherein, when the community information received by the reception section comprises position information in a predetermined position area, the display control section displays the community information on the display screen.

10. The mobile terminal according to claim 1, further comprising an angle/direction information acquisition section for acquiring angle/direction information of the mobile terminal,
    wherein the display control section superimposes an image included in the community information on the peripheral image acquired by the picked-up image acquisition section, based on the angle/direction information acquired by the angle/direction information acquisition section.

11. The mobile terminal according to claim 10,
    wherein the angle/direction information acquisition section acquires angle/direction information including an azimuth of a user corresponding to an angle/direction of the mobile terminal, and
    wherein the display control section superimposes an image included in the community information which corresponds to the azimuth of the user, on the peripheral image imaged by the imaging device.

12. A server device comprising:
a reception section for receiving movement information of mobile terminals possessed by a plurality of users from the respective mobile terminals;
a recording section for accumulating a history of the movement information received by the reception section with respect to each user and recording the history in a storage medium; and
a community information generation section for generating community information which can be shared between one user and another user, based on the history of the movement information with respect to each user recorded in the storage medium;
wherein the community information is generated by using a history of movement information that is determined to be common to the one user and the other user, and
wherein a history of movement information of the one user is switched from being inaccessible to accessible to at least another user belonging to a group of users associated with the one user through a common entity, the switch happening at a time when a mobile terminal of the one user enters a structure usually occupied by members of the group during a certain time-span, the time of entry falling within the time-span, and the at least another user being present within the structure at the time of entry.

13. An information processing system comprising:
a mobile terminal possessed by a user comprising:
a movement information acquisition section for acquiring movement information of the mobile terminal,
a picked-up image acquisition section for acquiring a peripheral image of the mobile terminal imaged by an imaging device, and
a transmission section for transmitting the movement information acquired by the movement information acquisition section to a server device connected to the mobile terminal via a network; and
the server device comprising:
a reception section for receiving movement information of a plurality of mobile terminals possessed by a plurality of users associated with the plurality of mobile terminals,
a recording section for accumulating a history of the movement information received by the reception section with respect to each of the plurality of users and recording the history in a storage medium, and
a community information generation section for generating community information which is sharable between one user and another user, based on the history of the movement information with respect to each user recorded in the storage medium, wherein the community information is generated by using a history of movement information that is determined to be common to the one user and the other user,
wherein the mobile terminal includes
a reception section for receiving the community information generated by the server device, and
a display control section for displaying, on a display screen, an image included in the community information received by the reception section, in a superimposed manner on a peripheral image of the mobile terminal acquired by the picked-up image acquisition section,
wherein a history of movement information of the mobile terminal user is switched from being inaccessible to accessible to at least another user belonging to a group of users associated with the mobile terminal user through a common entity, the switch happening at a time when the mobile terminal enters a structure usually occupied by members of the group during a certain time-span, the time of entry falling within the time-span, and the at least another user being present within the structure at the time of entry.

14. A display control method for community information in a mobile terminal possessed by a user, comprising the steps of:
acquiring movement information of the mobile terminal;
acquiring a peripheral image of the mobile terminal, which is imaged by an imaging device;
transmitting the acquired movement information to a server device which is connected to the mobile terminal via a network;
receiving community information which is generated by the server device, based on a history of the movement information that is determined to be common to both the user possessing the mobile terminal and another user, the community information being sharable between the user possessing the mobile terminal and the other user; and
displaying, on a display screen, an image included in the received community information, in a superimposed manner on the acquired peripheral image of the mobile terminal,
wherein a history of movement information of the user possessing the mobile terminal is switched from being inaccessible to accessible to at least another user belonging to a group of users associated with the user possessing the mobile terminal through a common entity, the switch happening at a time when the mobile terminal enters a structure usually occupied by members of the group during a certain time-span, the time of entry falling within the time-span, and the at least another user being present within the structure at the time of entry.

15. A non-transitory computer readable medium comprising program code for causing a computer to perform steps comprising:
acquiring movement information of a mobile terminal possessed by a user,
acquiring a peripheral image of the mobile terminal, which is imaged by an imaging device,
transmitting the acquired movement information to a server device which is connected to the mobile terminal via a network,
receiving community information generated by the server device based on a history of the movement information that is determined to be common to both the user possessing the mobile terminal and another user, the community information being sharable between the user possessing the mobile terminal and the other user, and
displaying, on a display screen, an image included in the received community information, in a superimposed manner on the acquired peripheral image of the mobile terminal,
wherein a history of movement information of the mobile terminal user is switched from being inaccessible to accessible to at least another user belonging to a group of users associated with the mobile terminal user through a common entity, the switch happening at a time when the mobile terminal enters a structure usually occupied by members of the group during a certain time-span, the time of entry falling within the time-span, and the at least another user being present within the structure at the time of entry.

\* \* \* \* \*